US011412601B2

(12) United States Patent
Aliakseyeu et al.

(10) Patent No.: US 11,412,601 B2
(45) Date of Patent: Aug. 9, 2022

(54) TEMPORARILY ADDING A LIGHT DEVICE TO AN ENTERTAINMENT GROUP

(71) Applicant: SIGNIFY HOLDING B.V., Eindhoven (NL)

(72) Inventors: Dzmitry Viktorovich Aliakseyeu, Eindhoven (NL); Jonathan David Mason, Waalre (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/294,754

(22) PCT Filed: Nov. 25, 2019

(86) PCT No.: PCT/EP2019/082346
§ 371 (c)(1),
(2) Date: May 18, 2021

(87) PCT Pub. No.: WO2020/114812
PCT Pub. Date: Jun. 11, 2020

(65) Prior Publication Data
US 2022/0015212 A1 Jan. 13, 2022

(30) Foreign Application Priority Data
Dec. 7, 2018 (EP) ..................................... 18211043

(51) Int. Cl.
*H05B 47/155* (2020.01)
*H05B 47/19* (2020.01)

(52) U.S. Cl.
CPC .......... *H05B 47/155* (2020.01); *H05B 47/19* (2020.01)

(58) Field of Classification Search
CPC ...... H05B 47/10; H05B 47/19; H05B 47/105; H05B 47/155; H05B 47/175; H04W 8/00; H04W 84/18
See application file for complete search history.

(56) References Cited

U.S. PATENT DOCUMENTS

| 11,079,913 | B1* | 8/2021 | Kim ...................... G06F 3/167 |
| 2011/0241848 | A1 | 10/2011 | Van Herk |
| 2017/0105095 | A1* | 4/2017 | Um ........................ H04W 4/33 |
| 2018/0035513 | A1 | 2/2018 | Magielse et al. |
| 2018/0098408 | A1 | 4/2018 | Hubbers et al. |
| 2020/0137848 | A1 | 4/2020 | Kamp et al. |
| 2020/0167846 | A1* | 5/2020 | Aliakseyeu ............. G06N 5/04 |
| 2020/0413520 | A1* | 12/2020 | Aliakseyeu .......... H05B 47/115 |

FOREIGN PATENT DOCUMENTS

WO 2020007762 A1 1/2020

* cited by examiner

*Primary Examiner* — Haissa Philogene

(57) ABSTRACT

A method comprises detecting that a light device (61) which has not been commissioned into a lighting system has been added to the lighting system. The method further comprises determining whether the entertainment mode is active, adding the light device to the entertainment group (51,52,53) upon detecting that the light device has been added to the lighting system in dependence on the entertainment mode being active, and controlling the light device to render one or more light effects synchronized to the media content in the entertainment mode after the light device has been added to the entertainment group. The method further comprises detecting that the light device is unavailable and removing the light device from the entertainment group upon detecting that the light device is unavailable.

14 Claims, 5 Drawing Sheets

TEMPORARILY ADDING A LIGHT DEVICE TO AN ENTERTAINMENT GROUP

CROSS-REFERENCE TO PRIOR APPLICATIONS

This application is the U.S. National Phase application under 35 U.S.C. § 371 of International Application No. PCT/EP2019/082346, filed on Nov. 25, 2019, which claims the benefit of European Patent Application No. 18211043.7, filed on Dec. 7, 2018. These applications are hereby incorporated by reference herein.

FIELD OF THE INVENTION

The invention relates to a system for assigning a light device to an entertainment group in a lighting system, said lighting system comprising a plurality of commissioned light devices and said entertainment group comprising one or more of said plurality of commissioned light devices, currently available light devices in said entertainment group being controlled to render light effects synchronized to media content in an entertainment mode.

The invention further relates to a method of assigning a light device to an entertainment group in a lighting system, said lighting system comprising a plurality of commissioned light devices and said entertainment group comprising one or more of said plurality of commissioned light devices, currently available light devices in said entertainment group being controlled to render light effects synchronized to media content in an entertainment mode.

The invention also relates to a computer program product enabling a computer system to perform such a method.

BACKGROUND OF THE INVENTION

Although the majority of lighting devices are fixed to walls, ceilings or cabinets, portable lighting devices are useful in certain situations. Modern portable lighting devices such as the Philips Hue Go provide more functionality than the traditional portable light device such as the traditional desk lamp.

US 2018/0035513 A1 describes a lighting system in which a control unit detects when a portable lighting device is within a predetermined vicinity of a fixed lighting device and switches the portable lighting device to a slave role or master role instead of an independent role in response to the detection of the portable lighting devices in the predetermined vicinity. For example, when someone switches on the fixed lighting device in his garage to a cool-white light and later brings his portable lighting device with a user-defined slave role into the garage to illuminate an area underneath the car, the portable A drawback of the lighting system of US 2018/0035513 A1 is that in practice a portable lighting device is often used at a fixed location and to use the portable device optimally at the fixed location, it typically needs to be commissioned first, e.g. linked to a room. Furthermore, if a user wants to use a lighting device to render light effects synchronized to media content in an entertainment mode, he typically needs to add it to an entertainment group first as part of the commissioning process. This is the case in the Philips Hue system, for example. It is currently still not practical to perform this commissioning fully automatically. The lighting system of US 2018/0035513 A1 is not well suited to situations in which manual commissioning is desirable.

SUMMARY OF THE INVENTION

It is a first object of the invention to provide a system, which is able to control a newly added portable light device automatically in a lighting system in which light devices normally need to be commissioned.

It is a second object of the invention to provide a method, which is able to control a newly added portable light device automatically in a lighting system in which light devices normally need to be commissioned.

In a first aspect of the invention, the system comprises at least one input interface, at least one output interface, and at least one processor configured to use said at least one input interface to detect that a light device has been added to said lighting system, said light device not being commissioned into said lighting system, determine whether said entertainment mode is active, add said light device to said entertainment group upon detecting that said light device has been added to said lighting system in dependence on said entertainment mode being active, use said at least one output interface to control said light device to render one or more light effects synchronized to said media content in said entertainment mode after said light device has been added to said entertainment group, use said at least one input interface to detect that said light device is unavailable, and remove said light device from said entertainment group upon detecting that said light device is unavailable.

Gamers like to play in a variety of ways. Sometimes, they sit at home on their own, playing until the early hours of the morning. At other times, the same gamer may play online with others from all around the world. Sometimes, they will invite friends over or they will turn up at a friend's house with console in hand to play together. It is expected that in the may do this in particular to enhance the gaming experience, but also to enhance other entertainment experiences, e.g. watching TV and movies.

By temporarily adding a newly added light device to the entertainment group when it is added while the entertainment mode is active, the newly added light device may be controlled to render light effects synchronized to media content even though the light device has not been commissioned. Since commissioning light devices might require users to spend time linking the new light devices to a room and then add them to an entertainment group, which may be cumbersome, they would be less likely to bring their own light device(s). The light device is removed again from the entertainment group when the light device is detected to be unavailable, as the light device has not been commissioned. Light devices added in other situations would normally need to be commissioned first before their first use in the lighting system.

Said system may be a lighting system which further comprises said light device and/or one or more other light devices or may be part of a lighting system which comprises said light device and/or one or more other light devices. Commissioning said light device into said lighting system may comprise manually assigning said light device to said entertainment group and/or manually assigning said light device to a room, for example. Said at least one processor may be configured to remove said light device from said entertainment group upon determining that said entertainment mode has ended. Said light device may be a mobile or portable light device, for example. A portable device is a device that can easily be carried or moved and is not fixed to a ceiling, wall or cabinet. Certain types of portable devices only work if connected to an external power source, but other types of portable devices comprise a battery. A mobile device normally comprises a battery.

The system may detect that the light device has been added to the lighting system when the light device, while not being commissioned, is switched on while it is within RF (e.g. Zigbee) receiving range of the lighting system (e.g. of any device of the lighting system with routing functionality). InterPAN communication, e.g. as defined in the Zigbee standard, may be used to control the light device in entertainment mode while it is not commissioned.

Said at least one processor may be configured to prevent said light device from being manually controlled as part of said lighting system until said light device has been commissioned into said lighting system. This prevents that the light device behaves unexpectedly due to it being controlled without being commissioned, e.g. without the use of Said at least one processor may be configured to use said at least one output interface to provide a recommendation of a physical location for said light device after said light device has been added to said entertainment group. This allows the user to optimize the entertainment experience, e.g. to obtain an entertainment experience with light completely surrounding the viewer(s).

Said at least one processor may be configured to use said at least one output interface to provide a user interface which allows a user to identify a physical position of said light device after said light device has been added to said entertainment group. Typically, the light setting of a light device controlled in entertainment mode depends on a spatial position of the lighting device. For example, colors to be rendered on a light device left of a TV may be extracted from the left part of the video content. By allowing the user to identify the physical position of the light device, the light device may be controlled to render colors extracted from the corresponding part of the video content.

Said at least one processor may be configured to store said identified physical position in a memory and obtain said identified physical position from said memory upon detecting that said light device has been added to said lighting system again after having been removed. Thus, the physical position (i.e. spatial location) identified by the user is remembered by the system, and if the same light device is used again, the last set position becomes the default position, so the user does not need to go over this step next time if he wants to use this extra light device in the same location. The identified physical position is not used to commission the lighting device, but it is used as default position and the user is still able to identify a different physical position in the above-mentioned user interface if needed. If the user uses the light device in the same way, he only needs connect the light device to mains power and place it in the same location he placed it last time. Said at least one processor may be configured to add said light device to said entertainment group in dependence on said light device being added to said lighting system and said entertainment mode being started within a certain time period of each other. In most cases, light devices will be added to the lighting system just after or just before the entertainment mode has been started. If other users use the lighting system as well and may add other light devices while the entertainment mode is active, it is beneficial to limit the time period during which added light devices will automatically be added to the entertainment group.

Said at least one processor may be configured to add said light device to said entertainment group upon detecting that said light device has been added to said lighting one light device of said entertainment group. If other users use the lighting system as well and may add other light devices while the entertainment mode is active, it is beneficial to only automatically add light devices to the entertainment group that are near one or more of the light devices already in the entertainment group.

Said at least one processor may be configured to add said light device to said entertainment group upon detecting that said light device has been added to said lighting system further in dependence on a type of said light device and/or a said light device being coupled to a same power supply as another light device of a same type as said light device. If other users use the lighting system as well and may add other light devices while the entertainment mode is active, it is beneficial to only automatically add light devices to the entertainment group if certain conditions are met. As a first example, a light device sold as part of an entertainment package may be defined as an entertainment light in its firmware and may be automatically added to the entertainment group when added to the lighting system when the entertainment mode is active.

As a second example, multiple light devices of a certain type, e.g. Philips HuePlay, are able to use the same power supply and if a new lighting device is coupled to the power supply of a lighting device of the same type that is already in the entertainment group, this new lighting device may be added to the entertainment group automatically if it is added when the entertainment mode is active. As a third example, after a light device has been commissioned into a first lighting system and added to an entertainment group as part of this commissioning, a marker is stored in the non-volatile memory of the light device that indicates that this is an entertainment light. Then, when the light device is taken to a second lighting system, the marker is recognized (e.g. by the bridge), and the light device is added to the entertainment group automatically if the user adds the second light device when the entertainment mode is active.

In a second aspect of the invention, the method comprises detecting that a light device has been added to said lighting system, said light device not being commissioned into said lighting system, determining whether said entertainment mode is active, adding said light device to said entertainment group upon detecting that said light device has been added to said lighting system in dependence on said entertainment mode being active, controlling said light device to render one or more light effects synchronized to said media content in said entertainment mode after said light device has been added to said entertainment group, detecting that said light device is unavailable, and removing said light device from said performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for assigning a light device to an entertainment group in a lighting system, said lighting system comprising a plurality of commissioned light devices and said entertainment group comprising one or more of said plurality of commissioned light devices, currently available light devices in said entertainment group being controlled to render light effects synchronized to media content in an entertainment mode.

The executable operations comprise detecting that a light device has been added to said lighting system, said light device not being commissioned into said lighting system, determining whether said entertainment mode is active, adding said light device to said entertainment group upon detecting that said light device has been added to said lighting system in dependence on said entertainment mode being active, controlling said light device to render one or more light effects synchronized to said media content in said entertainment mode after said light device has been added to said entertainment group, detecting that said light device is unavailable, and removing said light device from said entertainment group upon detecting that said light device is unavailable.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
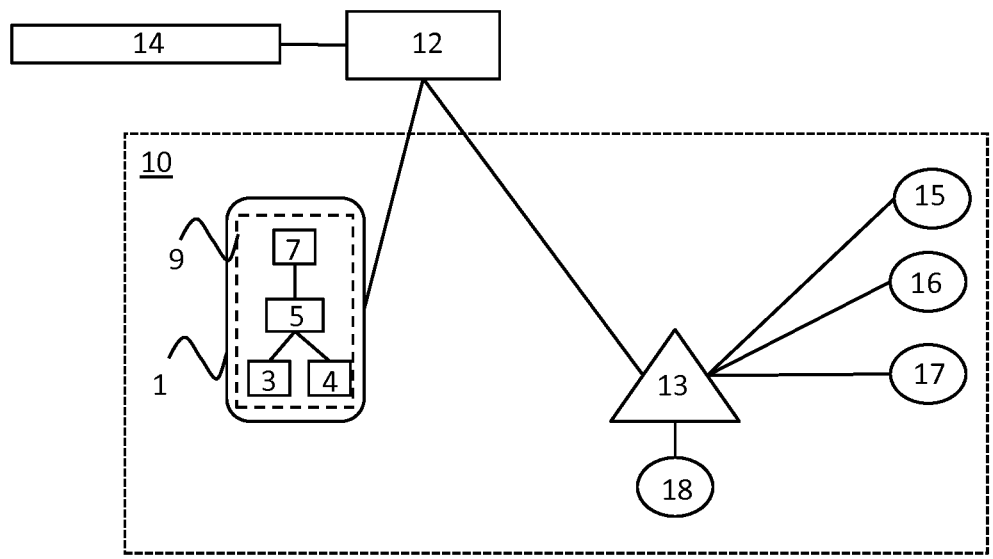
FIG. 1 shows a first embodiment of the system.

FIG. 1 shows a first embodiment of the system for assigning a light device to an entertainment group in a lighting system. A lighting system 10 comprises a plurality of commissioned light devices 15-17 and the entertainment group comprises one or more of the plurality of commissioned light devices. Currently available light devices in the entertainment group are controlled to render light effects synchronized to media content in an entertainment mode.

In the embodiment of FIG. 1, the system is a mobile device 1. The mobile device 1 is connected to a wireless LAN access point 12. A bridge 13, e.g. a Philips Hue bridge, is also connected to the wireless LAN access point 12, e.g. via Ethernet. The bridge 13 communicates with the light devices 15-17, e.g. using Zigbee technology. The light devices 15-17 may be Philips Hue lights, for example. A TV 14 is also connected to the wireless LAN access point 12. The lighting system 10 further comprises the mobile device 1 and the bridge 13. The media content may be rendered on the TV 14 or on the mobile device 1, for example.

The mobile device 1 comprises a receiver 3, a transmitter 4, a processor 5, memory 7 and a display 9. The processor 5 is configured to use the receiver 3 to detect that a light device 18 has been added to the lighting system 10. The light device 18 is not commissioned into the lighting system 10. The bridge 13 may inform the mobile device 1 when a light device has been added to the lighting system 10, for example. The bridge 13 or one of the light devices 15-17 connected to the bridge 13 may have received a wireless transmission from the light device 18, for example. The light device 18 may be a mobile or portable light device, for example.

The processor 5 is further configured to determine whether the entertainment mode is active and add the light device 18 to the entertainment group upon detecting that the light device 18 has been added to the lighting system 10 in dependence on the entertainment mode being active. The entertainment mode may be activated simply by launching an entertainment lighting app, e.g. Philips' HueSync app, on the mobile device 1 or by activating a certain mode, e.g. by pressing a "Start Light Synch" button, in an (entertainment) lighting app running on the mobile device 1, for example. A variable stored in the memory 7 may indicate whether the entertainment mode is active, for example. Which light devices are included in the entertainment group may be stored in the memory 7 and/or in the bridge 13, for example.

The processor 5 is further configured to use the transmitter 4 to control the light device 18 via the bridge 13 to render one or more light effects synchronized to the media content in the entertainment mode after the light device 18 has been added to the entertainment group, use the receiver 3 to detect that the light device 18 is unavailable and remove the light device 18 from the entertainment group upon detecting that the light device 18 is unavailable.

The one or more light effects may be determined from a light script and/or determined based an analysis of the media content, for example. The bridge 13 may inform the mobile device 1 when a light device has become unavailable (e.g. is unreachable), for example. The processor 5 may also be configured to use the transmitter 4 to control the other light devices in the entertainment group via the bridge 13 to render one or more light effects synchronized to the media content in the entertainment mode.

In this way, foreign hue luminaires can be connected directly to an is active and unknown hue luminaires are powered up, the system assumes that they will be used for entertainment thus bypassing the traditional set up procedure. The added luminaires may need to fulfill certain requirements before the traditional set up procedure is bypassed, e.g. they may need to be of a certain type and/or within a certain distance of at least one other luminaire in the entertainment group.

When the system assumes that the added luminaires will be used for entertainment, an application running on a mobile device may show a drag and drop entertainment screen highlighting the new luminaires, so they can be placed in the entertainment group immediately. Once tested, they are ready to use. When the users leave to go home, they unplug their lights and the system will automatically forget them. Normally, the new luminaire will respond only for entertainment and not appear on other versions of the applications (unless as ghosts that cannot be selected or controlled).

In the embodiment of the mobile device 1 shown in FIG. 1, the mobile device 1 comprises one processor 5. In an alternative embodiment, the mobile device 1 comprises multiple processors. The processor 5 of the mobile device 1 may be a general-purpose processor, e.g. from ARM or Qualcomm or an application-specific processor. The processor 5 of the mobile device 1 may run an Android or iOS operating system for example. The display 9 may comprise an LCD or OLED display panel, for example. The display 9 may be a touch screen, for example. The processor 5 may use this touch screen to provide a user interface, for example. The memory 7 may comprise one or more memory units. The memory 7 may comprise solid state memory, for example.

The receiver 3 and the transmitter 4 may use one or more wireless communication technologies such as Wi-Fi (IEEE 802.11) to communicate with the wireless LAN access point 12, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The mobile device 1 may further comprise a camera (not shown). This camera may comprise a CMOS or CCD sensor, for example. The mobile device 1 may comprise other components typical for a mobile device such as a battery and a power connector. The invention may be implemented using a computer program running on one or more processors.

In the embodiment of FIG. 1, a bridge is used to control light devices 15-18. In an alternative embodiment, light devices 15-18 are controlled without using a bridge. In the embodiment of FIG. 1, the system is a mobile device. In an alternative embodiment, the system of the invention is a different device, e.g. a bridge, or comprises a plurality of devices.

Figure 2:
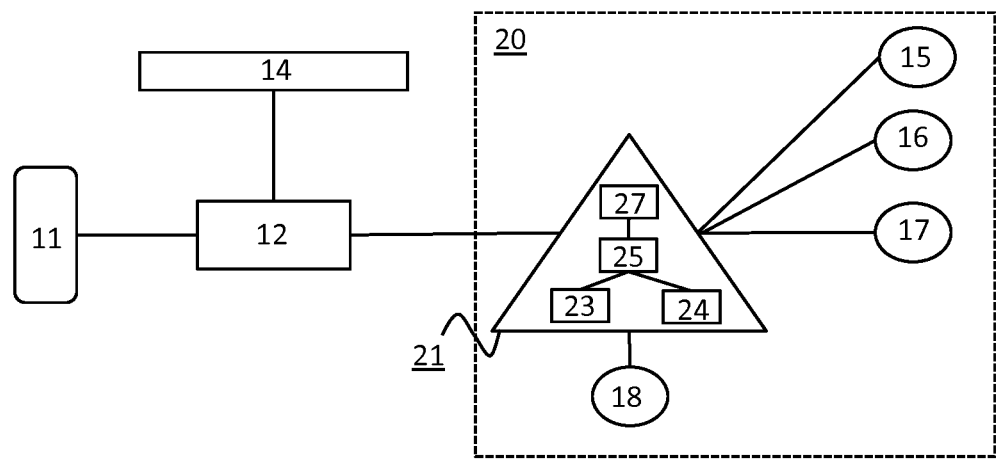
FIG. 2 shows a second embodiment of the system.

FIG. 2 shows a second embodiment of the system of the invention: a bridge 21, e.g. a Philips Hue bridge. The bridge 21 and the light devices 15-17 are part of the lighting system 20. The bridge 21 comprises a receiver 23, a transmitter 24, a processor 25, and a memory 27. The processor 25 is configured to use the receiver 23 to detect that the light device 18 has been added to the lighting system 20. The light device 18 is not commissioned into the lighting system 20. The bridge 21 may receive a transmission from the light device 18 directly or may receive a transmission via one or more of the light devices 15-17, for example.

The processor 25 is further configured to determine whether the entertainment mode is active and add the light device 18 to the entertainment group upon detecting that the light device 18 has been added to the lighting system 20 in dependence on the entertainment mode being active. The entertainment mode may be activated on mobile device 11, e.g. as previously described in relation to mobile device 1. The mobile device 11 may inform the bridge 21 explicitly that the entertainment mode is active or the bridge 21 may deduce this from the light commands it receives from the mobile device 11 (destined for the light devices 15-17).

The processor 25 is further configured to use the transmitter 24 to control the light device 18 to render one or more light effects synchronized to the media content in the entertainment mode after the light device 18 has been added to the entertainment group, use the receiver 23 to detect that the light device 18 is unavailable and remove the light device 18 from the entertainment group upon detecting that the light device 18 is unavailable.

The processor 25 may also be configured to use the transmitter 24 to control the other light devices in the entertainment group to render one or more light effects synchronized to the media content in the entertainment mode. The processor 25 may be configured to control the light device 18 to render the same light effects as one of the other light devices in the entertainment group, for example.

Alternatively, the processor 25 may be configured to inform the mobile device 11 that light device 18 should be (temporarily) added to the entertainment group and may then receive light commands from the mobile device 11 (using the receiver 23) that are destined for the light device 18. The processor 25 may be configured to control the light device 18 to render the one or more light effects synchronized to the media content as 18 is unavailable when it no longer receives transmissions from the light device 18, e.g. when it no longer receives responses to its transmissions to the light device 18.

In the embodiment of the bridge 21 shown in FIG. 2, the bridge 21 comprises one processor 25. In an alternative embodiment, the bridge 21 comprises multiple processors. The processor 25 of the bridge 21 may be a general-purpose processor, e.g. ARM-based, or an application-specific processor. The processor 25 of the bridge 21 may run a Unix-based operating system for example. The memory 27 may comprise one or more memory units. The memory 27 may comprise one or more hard disks and/or solid-state memory, for example. The memory 27 may be used to store a table of connected lights, for example.

The receiver 23 and the transmitter 24 may use one or more wired or wireless communication technologies such as Ethernet to communicate with the wireless LAN access point 12, for example. In an alternative embodiment, multiple receivers and/or multiple transmitters are used instead of a single receiver and a single transmitter. In the embodiment shown in FIG. 2, a separate receiver and a separate transmitter are used. In an alternative embodiment, the receiver 23 and the transmitter 24 are combined into a transceiver. The bridge 21 may comprise other components typical for a network device such as a power connector. The invention may be implemented using a computer program running on one or more processors.

Figure 3:
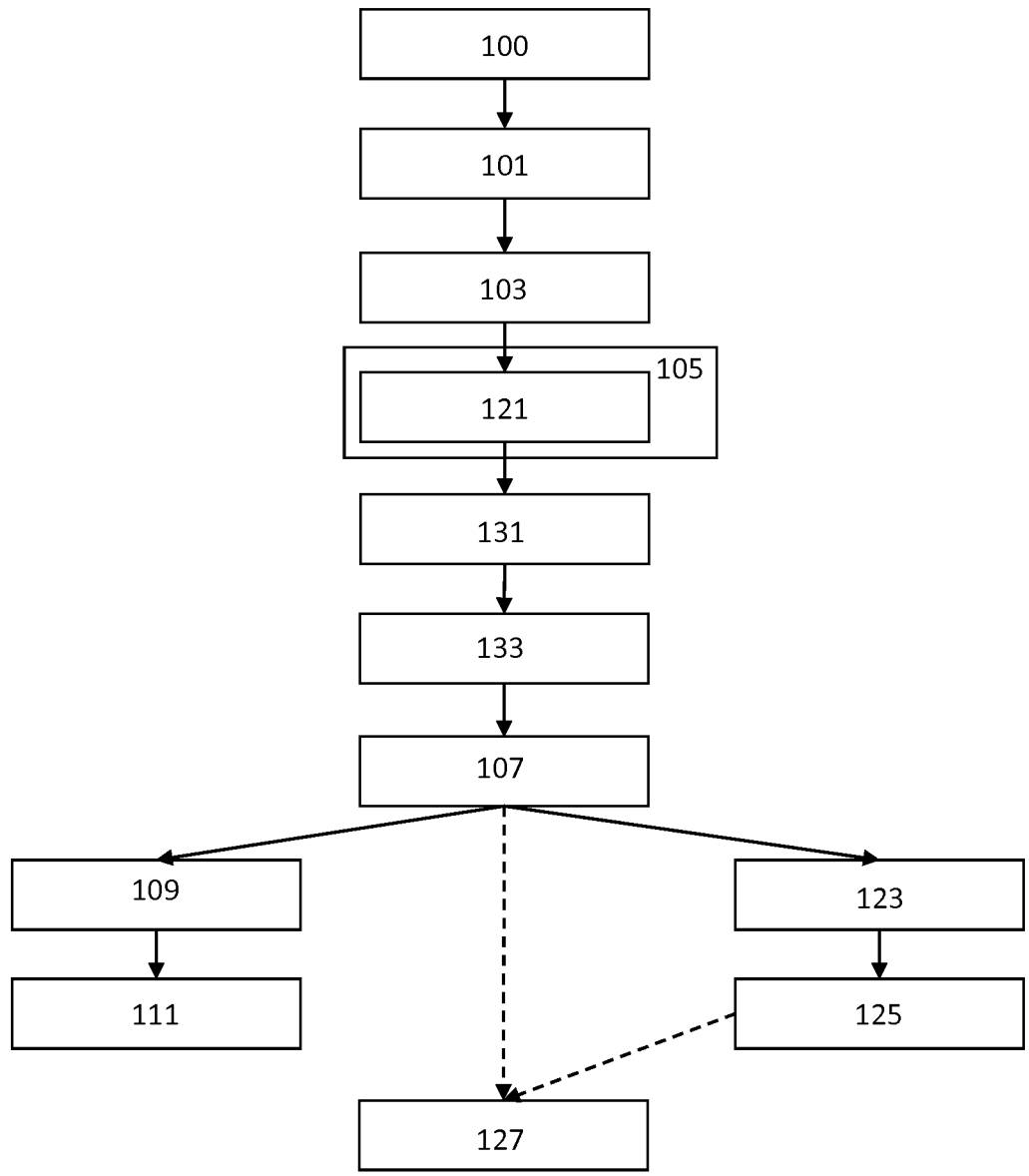
FIG. 3 is a flow diagram of a first embodiment of the method.

A first embodiment of the method of assigning a light device to an entertainment group in a lighting system is shown in FIG. 3. The lighting system comprises a plurality of commissioned light devices and the entertainment group comprises one or more of the plurality of commissioned light devices. Currently available light devices in the entertainment group are controlled to render light effects synchronized to media content in an entertainment mode.

A step 100 comprises activating the entertainment mode. The entertainment mode is typically started by a user, e.g. using his mobile device. The entertainment mode may be activated simply by launching an entertainment lighting app, e.g. Philips' HueSync app, or by activating a certain mode, e.g. by pressing a "Start Light Synch" button, in an (entertainment) lighting app. The entertainment mode may be started in relation to a certain content item. A step 101 comprises detecting that a light device has been added to the lighting system. The light device is not commissioned into the lighting system. A step 103 comprises determining whether the entertainment mode is active.

A step 105 comprises adding the light device to the entertainment group upon entertainment mode being active. In the embodiment of FIG. 3, step 105 comprises a sub step 121. Step 121 comprises preventing the light device from being manually controlled as part of the lighting system until the light device has been commissioned into the lighting system.

In the embodiment of FIG. 3, steps 131 and 133 are performed after step 105. Step 131 comprises providing a recommendation of a physical location for the light device after the light device has been added to the entertainment group. This is illustrated with the help of FIGS. 4 and 5.

Figure 4:
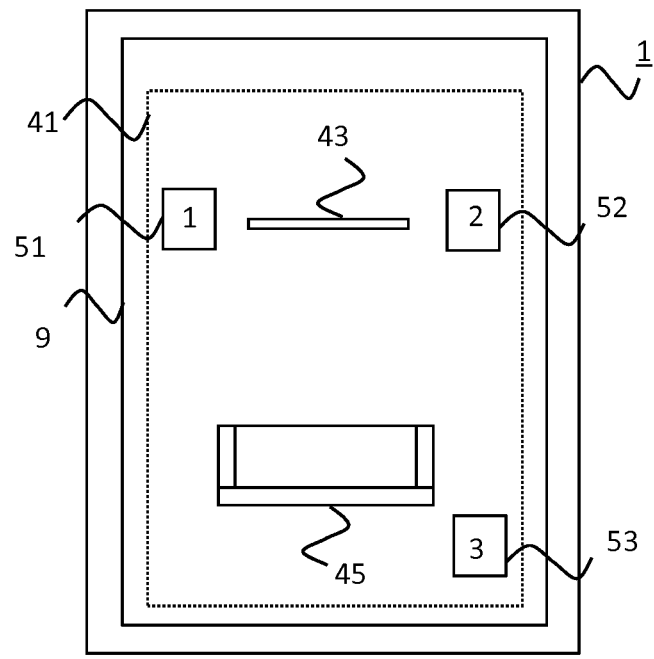
FIG. 4 shows an example of a user interface for visualizing an entertainment group at a first moment.

In the example of FIG. 4, a user interface 41 is shown on the display 9 of the mobile device 1 of FIG. 1. In the user interface 41, the living room of the user is depicted. In the living room representation, an icon 43 representing a TV, an icon 45 representing a couch and three icons 51, 52 and 53 representing three light devices are depicted. These three light devices are therefore part of the entertainment group. The user has previously placed these icons at their respective locations using the user interface 41. Based on this information, the light devices corresponding to icons 51,52 and 53, are selected for rendering the light effects synchronized to the media content.

Figure 5:
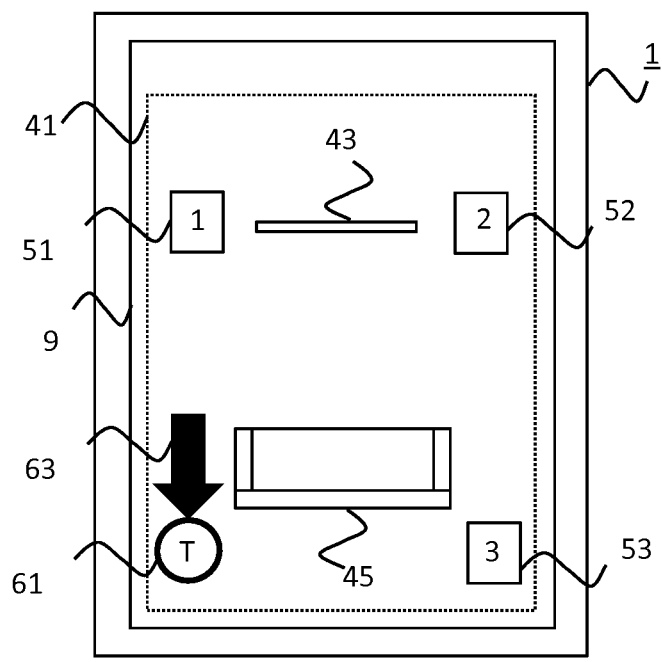
FIG. 5 shows an example of the user interface of FIG. 4 at a second moment.

The user interface of FIG. 5 is shown when a new light device has been added while the entertainment mode is active if the new light device is not commissioned into the lighting system (yet). This user interface is similar to the user interface of FIG. 4. However, an icon 61 is displayed for the temporary light device. The icon 61 is displayed at a location recommended for the temporary light device. This recommendation is emphasized by displaying an arrow 63. The user interface of FIG. 5 also allows the user to identify a physical position of the light device, normally the actual physical location of the light device, by dragging the icon 61. The user may do this if the user is not able or does not want to place the light device at the recommended location.

When new light devices are detected, it is assumed that the new light devices are to be added to the entertainment group. If the user does not want this, then the user can click away/cancel the user interface 61. Step 107 is performed after the user normally closes the user interface of FIG. 5, i.e. without clicking away the user interface. Step 107 comprises controlling the light device to render one or more light effects synchronized to the media content in the entertainment mode after the light device has been added to the entertainment group.

A step 109 comprises detecting that the light device is unavailable. A step 111 comprises removing the light device from the entertainment group upon detecting that the commissions the light device into the lighting system. Commissioning the light device into the lighting system may comprise manually assigning the light device to the entertainment group and/or manually assigning the light device to a room, for example.

In the embodiment of FIG. 3, if the light device has not been removed from the lighting system and has not been commissioned into the lighting system when the entertainment mode ends in step 123, step 125 is performed. The entertainment mode may be ended by the user terminating an entertainment lighting app, e.g. Philips' HueSync app, or by the user deactivating a certain mode, e.g. by pressing a "Stop Light Sync" button, in an (entertainment) lighting app. The entertainment mode may end automatically if the entertainment mode was started in relation to a certain content item and this content item ends. Step 125 comprises removing the light device from the entertainment group upon determining that the entertainment mode has ended. After the light device has been removed from the entertainment group, it may still be commissioned into the lighting system in step 127.

Figure 6:
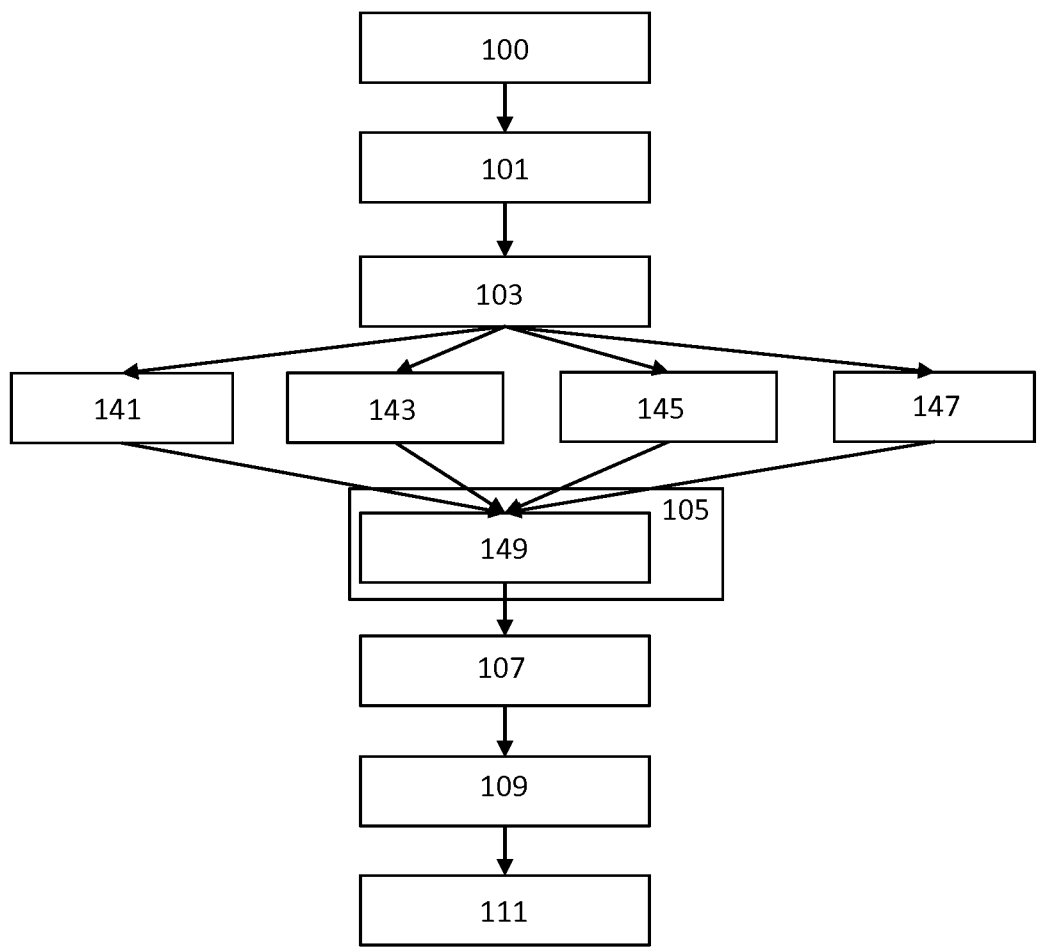
FIG. 6 is a flow diagram of a second embodiment of the method.

A second embodiment of the method is shown in FIG. 6. The method comprises the same steps 100-103 and 107-111 as described in relation to FIG. 3. After it has been determined in step 103 that the entertainment mode is active, steps 141, 143, 145 and 147 are performed. Step 141 comprises determining how much time has elapsed between the entertainment zone being started and the light device being added to the lighting system (i.e. being detected by the lighting system). Step 143 comprises determining one or more distances between the added light device and the one or more light devices already in the entertainment group.

Step 145 comprises determining a type of the light device, e.g. by receiving information included in the firmware of the light device from the light device. Step 147 comprises determining whether the light device is coupled to the same power supply as another light device that has a same type as the light device. In the embodiment of FIG. 6, step 105 comprises a sub step 149.

Step 149 comprises adding the light device to the entertainment group upon detecting that the light device has been added to the lighting system in dependence on the entertainment mode being active and:

the light device being added to the lighting system and the entertainment mode being started within a certain time period of each other; or
  the light device being of a certain type; or
  the light device being within a certain distance of at least one light device of the entertainment group; or
  the light device being coupled to a same power supply as another light device of a same type as the light device (e.g. HuePlay's power supply supports up to 3 HuePlays to be connected to it).

As a first example, when a Hue bridge recognizes an added light device as a HuePlay luminaire (or a certain type of HuePlay luminaire) and the Hue Sync app is running, the entertainment setup (user interface of FIG. 5) may be launched automatically, as this is what this type of luminaire is intended to be used for. The type of the light device may be defined in firmware and there may be different types of the same model. For example, when a HuePlay is sold in an entertainment package, it could be defined as an entertainment light in its firmware, and when a HuePlay is sold in a sleep bundle, it could be defined as a normal light in its firmware.

As a second example, when a light device is added near a light device currently in the entertainment group just before or just after the entertainment mode is activated, the entertainment setup (e.g. user interface of FIG. 5) may be launched automatically.

Another manner of disambiguating the added light devices from other unrelated added light devices and ensuring that the normal setup is not bypassed accidentally comprises letting the user physically interact in a certain manner with the added light devices and/or the bridge, e.g. by powering on and off the light devices twice or by powering the light devices once and pressing a certain button on the bridge.

In an alternative embodiment, only a subset of steps 141,143,145 and 147 are included. In a variant on the embodiment of FIG. 3, sub step 149 of step 105 and one or more of the steps 141,143,145 and 147 may be included. Steps 107, 109 and 111 are performed after step 105, as described in relation to FIG. 3.

Figure 7:
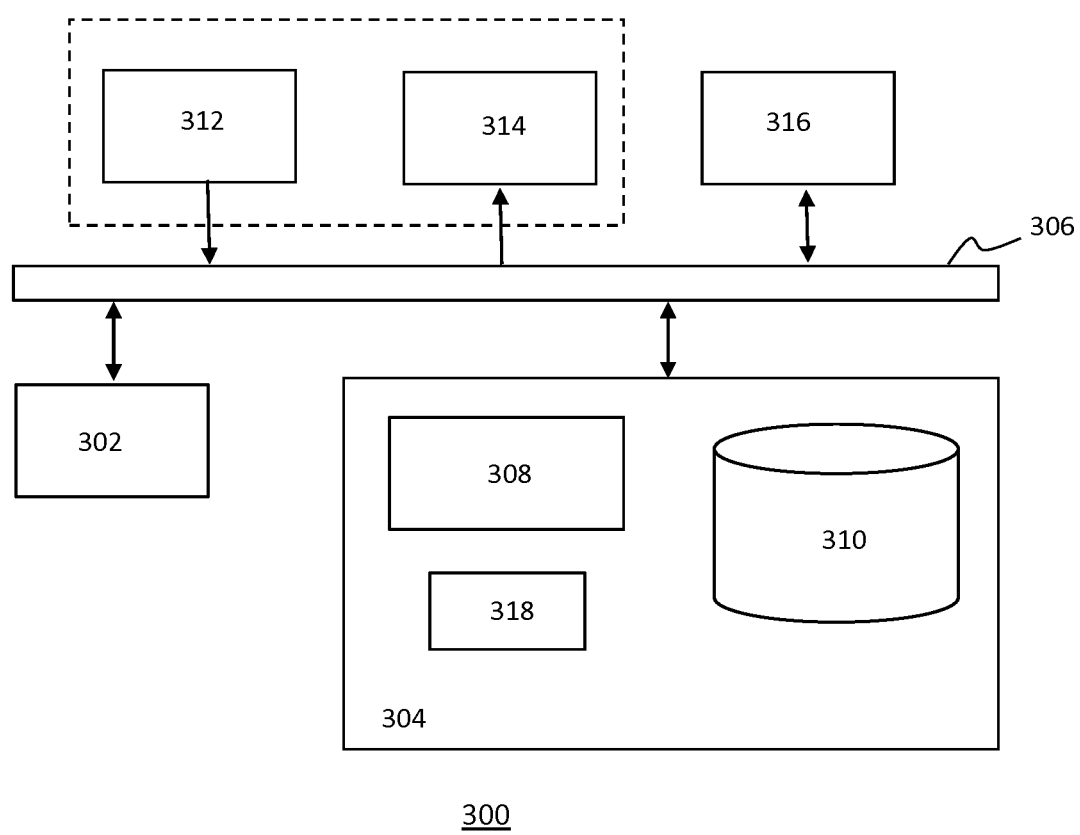
FIG. 7 is a block diagram of an exemplary data processing system for performing the method of the invention.

FIG. 7 depicts a block diagram illustrating an exemplary data processing system that may perform the method as described with reference to FIGS. 3 and 6.

As shown in FIG. 7, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 7 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of As pictured in FIG. 7, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 7) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for assigning a light device to an entertainment group in a lighting system, said lighting system comprising a plurality of commissioned light devices and said entertainment group comprising one or more of said plurality of commissioned light devices, currently available light devices in said entertainment group being controlled to render light effects synchronized to media content in an entertainment mode, said system comprising:
   at least one input interface;
   at least one output interface; and
   at least one processor configured to:
      use said at least one input interface to detect that a light device has been added to said lighting system, said light device not being commissioned into said lighting system,
      determine whether said entertainment mode is active,
      add said light device to said entertainment group upon detecting that said light device has been added to said lighting system in dependence on said entertainment mode being active,
      use said at least one output interface to control said light device to render one or more light effects synchronized to said media content in said entertainment mode after said light device has been added to said entertainment group,
      use said at least one input interface to detect that said light device is unavailable, and
      remove said light device from said entertainment group upon detecting that said light device is unavailable.

2. A system as claimed in claimed 1, wherein said at least one processor is configured to prevent said light device from being manually controlled as part of said lighting system until said light device has been commissioned into said lighting system.

3. A system as claimed in claim 2, wherein commissioning said light device into said lighting system comprises manually assigning said light device to said entertainment group and/or manually assigning said light device to a room.

4. A system as claimed in claim 1, wherein said at least one processor is configured to remove said light device from said entertainment group upon determining that said entertainment mode has ended.

5. A system as claimed in claim 1, wherein said light device is a mobile or portable light device.

6. A system as claimed in claim 1, wherein said at least one processor is configured to use said at least one output interface to provide a recommendation of a physical location for said light device after said light device has been added to said entertainment group.

7. A system as claimed in claim 1, wherein said at least one processor is configured to use said at least one output interface to provide a user interface which allows a user to identify a physical position of said light device after said light device has been added to said entertainment group.

8. A system as claimed in claim 7, wherein said at least one processor is configured to store said identified physical position in a memory and obtain said identified physical position from said memory upon detecting that said light device has been added to said lighting system again after having been removed.

9. A system as claimed in claim 1, wherein said at least one processor is configured to add said light device to said entertainment group in dependence on said light device being added to said lighting system and said entertainment mode being started within a certain time period of each other.

10. A system as claimed in claim 1, wherein said at least one processor is configured to add said light device to said entertainment group upon detecting that said light device has been added to said lighting system further in dependence on said light device being within a certain distance of at least one light device of said entertainment group.

11. A system as claimed in claim 1, wherein said at least one processor is configured to add said light device to said entertainment group upon detecting that said light device has been added to said lighting system further in dependence on a type of said light device and/or said light device being coupled to a same power supply as another light device of a same type as said light device.

12. A lighting system comprising the system of claim 1 and one or more light devices.

13. A method of assigning a light device to an entertainment group in a lighting system, said lighting system comprising a plurality of commissioned light devices and said entertainment group comprising one or more of said plurality of commissioned light devices, currently available light devices in said entertainment group being controlled to render light effects synchronized to media content in an entertainment mode, said method comprising:
  detecting that a light device has been added to said lighting system, said light device not being commissioned into said lighting system;
  determining whether said entertainment mode is active;
  adding said light device to said entertainment group upon detecting that said light device has been added to said lighting system in dependence on said entertainment mode being active;
  controlling said light device to render one or more light effects synchronized to said media content in said entertainment mode after said light device has been added to said entertainment group;
  detecting that said light device is unavailable; and
  removing said light device from said entertainment group upon detecting that said light device is unavailable.

14. A computer program or suite of computer programs comprising at least one software code portion or a computer program product storing at least one software code portion, the software code portion, when run on a computer system, being configured for enabling the method of claim 13 to be performed.

* * * * *